Patented Dec. 26, 1939

2,184,890

UNITED STATES PATENT OFFICE 2,184,890

MANUFACTURE OF LEAD ARSENATE

James W. Swaine, Bayside, N. Y., assignor to General Chemical Company, New York, N. Y., a corporation of New York No Drawing. Application July 30, 1937, Serial No. 156,577

4 Claims. (Cl. 23—54)

This invention relates to the manufacture of acid lead arsenates suited for use as insecticides. More particularly, the invention is directed to improvements in methods for making lead arsenate and to improved lead arsenate products.

The literature suggests several processes for producing lead arsenate. In usual commercial practice it is customary to form in a reaction tank a water suspension of the total amount of litharge to be used and then slowly add, in the presence of a suitable catalyst such as acetic or nitric acid, the necessary quantity of arsenic acid at a rate such that there is present no appreciable local excess of arsenic acid, in other words, the lead oxide-arsenic acid reaction as a whole is carried out in the presence of an excess of litharge.

While the foregoing and other general procedures are often altered in minor respects by different manufacturers, it may be said the various lead arsenates on the market as a general rule possess the same physical and chemical characteristics. From a physical viewpoint commercial products may be described as relatively sphere-like, crystalline structures having all dimensions substantially equal. When mixed with water, such products form milky white suspensions and, when sprayed on foliage and dried, give a flat white appearance.

The principal aim of the present invention is to provide lead arsenate having improved insecticidal properties as compared with the insecticidal properties of the better grades of lead arsenates now on the market. A further object of the invention is provision of methods for making such improved products.

Although the acid lead arsenates produced by the methods herein described possess a higher total $As_2O_5$ content and a lower water soluble $As_2O_5$ content than the usual commercial lead arsenates, investigations on which the invention has been developed afford substantial basis for the view that the improved insecticide control obtained, particularly codling moth control, may be attributed not to any particularly important increase in toxicity of the product but to improved fruit and foliage coverage obtained after spraying and drying. On account of improved covering properties, consumption of larger toxic doses by the insects may be effected. On the basis of comparative field tests, the most apparent reason for increased insecticidal control is the improved coverage afforded by the lead arsenate products of the invention. Such coverage in turn seems to be attributable to certain distinctive physical characteristics of the lead arsenates of the invention.

Microscopic studies indicate that probably the most pronounced physical difference existing between the arsenates of the invention and the usual run of commercial products is that while such commercial products comprise crystals all three dimensions (length, width and thickness) of which are substantially equal, the lead arsenate products of the invention comprise flat, flake-like crystals having one dimension, thickness, much smaller than the other two dimensions, i. e., the length and width. Investigations show that the length and width of individual flakes or crystals constituting the products of the invention are generally about equal and may range from about 5 to approximately 30 microns. The flake-like crystals are very thin, and definitely show semi-transparency under magnification of 265 diameters. Although the thickness of some of the individual flakes may run as high as one micron, it appears the average thickness is less than one micron. Groups of crystals exhibit an iridescent, pearly lustre as distinguished from the flat white color of usual commercial products.

A further differentiating physical characteristic of the lead arsenates of the invention is the appearance of a water suspension. While water suspensions of the general run of commercial lead arsenates are a flat milky white, a suspension of the lead arsenates of the invention gives the appearance of a lustrous scintillation of surging pearly particles. Commercial lead arsenates after spraying and drying on fruit and foliage give a definite flat white. After spraying and drying, the arsenates of the invention produce an even and in most instances an unbroken coating having a distinct resemblance to aluminum, although the color is not usually quite as gray as aluminum paint. The silvery, aluminous appearance of dried spray of the arsenates of the invention is clearly distinguishable from the flat lusterless white color of the dried sprays of commercial lead arsenates. Observations of the movements of the particles of the arsenates of the invention in a freshly shaken water suspension, indicate the individual flaky crystals have the property of orienting themselves in a flowing medium so as to offer the least resistance to flow. When a suspension of these crystals is sprayed on foliage or fruit, the water droplets flowing off seem to cause the crystals to orient themselves so as to present a flat side of the crystals to the sprayed surface. This results in a much smaller run-off of the arsenate and a more even distribution of the deposit as well as greater tenacity of adherence and resistance to removal by subsequent rainfall. The smooth, even coating on the surface of sprayed fruit and foliage may very likely be attributed to the flat flake-like form of the crystal and its property of orienting itself in a flowing medium so that on run-off or evaporation of the spray solution, the crystal settles with its flat side to the surface of the fruit or foliage. Visual inspection of sprayed fruit and foliage shows that the coverage is in many instances unbroken and in any event much less broken than the coverage obtained when applying the better grades of commercial lead arsenates under the same spraying conditions.

The process by which the improved lead arsenates are made may be briefly described as a procedure in which (in the embodiment using lead oxide as source of lead) the lead oxide-arsenic acid reaction is carried out in what may be conveniently designated as two phases. The first phase of the reaction is carried out so that there is no excess of arsenic acid present and preferably so that there does exist an appreciable but relatively small excess of lead oxide. In the second phase, procedure is such that the arsenic acid is in appreciable but relatively small excess throughout the remainder of the reaction. In the preferred procedure, the reaction mass is then balanced, in the reaction vessel, with respect to litharge and arsenic acid, and the resulting slurry dried, for example on a drum drier.

Details of the process of the invention may be understood to advantage by first considering an illustrative example of the preferred procedure. The first phase is as follows: About 30 lbs. of 80% acetic acid is mixed with 1000 gallons of water in a reaction vat equipped with a suitable agitator and the solution so formed is heated to about 100° F. The acidity of the solution, induced by the acetic acid catalyst, is such as to create a pH of about 3. A lead oxide slurry is prepared from 2500 lbs. of litharge mixed with about 100 gallons of water. A stream of the slurry is fed into the reaction tank, at a rate of about 25 pounds of PbO per minute, until about 50 pounds of PbO have been introduced. The pH of the solution rises to about 5, and soluble lead acetate is formed to such an extent that dissolved lead is present in amount about 0.5% by weight of the liquid. Feed of arsenic acid (75% strength) is commenced, and acid and lead oxide are charged into the reaction tank substantially in reacting proportions to produce acid lead arsenate. Simultaneous feed of acid and lead oxide is continued for about 10 minutes at the end of which time interval the first phase of the reaction is complete. Such time interval constitutes about one-tenth of the total reaction time, and about 250 lbs. of lead oxide has been charged into the reaction tank. It will be noted that during this first phase there has not been present an excess of acid, the operation having been conducted so as to maintain the litharge in excess to the extent of about the 50 pounds of PbO initially charged. Further, introduction of PbO and arsenic acid is such as to maintain in the liquid a pH of about 5 and a soluble lead content of about 0.5% by weight of the liquid. In the course of the first phase a substantial amount of acid lead arsenate is produced in the form of a precipitate. As will be subsequently more fully discussed, it is understood the type of lead arsenate crystals thus formed is substantially the same as the lead arsenate produced in the usual commercial methods where an excess of lead oxide is maintained throughout the entire lead oxide-arsenic acid reaction.

At the end of the first phase, rate of acid feed is increased to such an extent that the reaction mass as a whole is changed over relatively quickly to a condition in which arsenic acid is present in excess over the amount reacting with all the PbO present to produce acid lead arsenate. The beginning of the second phase is thus initiated. Rate of acid feed is increased sufficiently so as to create and maintain in the reaction liquid throughout the second phase (excluding final balancing if such operation be used as is the case in practice of the preferred embodiment) the presence of dissolved arsenic acid in amount about 0.6% by weight of the liquid and to create therein a pH of about 1.9. That is, at any point during the second phase arsenic acid is in appreciable excess. Feed of acid and lead oxide, substantially in proportions reacting to produce acid lead arsenate, is continued until all but about 75 lbs. of the total amount of litharge to be charged has been fed into the reaction tank. When proceeding in accordance with the present example, about 2425 lbs. of litharge will have been charged into the reaction vat in about one hour and forty minutes, and there is still present in the reaction mass an arsenic acid excess. During both phases of the reaction, the temperature of the mass has been gradually increased to about boiling by the heat evolved and by extraneous steam charged into the mass. In accordance with preferred procedure, the necessary amount of litharge is then introduced into the batch to balance the same. Subsequent drying of the resulting lead arsenate slurry is carried out as in the usual practice, e. g., on a drum drier. The resulting acid lead arsenate product contains for example 33.1% total $As_2O_5$, 0.2% water soluble $As_2O_5$, and possesses the physical characteristics previously discussed.

In making up the initial lead oxide slurry, lead oxide of any suitable kind may be used. The amount of water employed is within the discretion of the operator, it being preferred to use only enough water to produce a readily flowable slurry. Lead hydroxide may also be used as a source of lead in place of lead oxide, in which case procedure is substantially the same as when using lead oxide.

Investigations show that most desirable results are obtained where the first phase of the lead oxide-arsenic acid reaction is carried out in the presence of an appreciable excess of lead oxide. Broadly, a PbO excess of any degree may be maintained. However, there are certain lower and upper PbO excess limits within which plant operations may be more conveniently conducted and within which limits best results are obtained with respect to the characteristics of the final products. One method of maintaining, in the first phase, most desirable conditions with respect to PbO excess is by adjusting feed of raw materials so as to regulate the soluble lead content in the liquid medium in which the reaction is taking place. In the manufacture of lead arsenate by reacting for example lead oxide and arsenic acid in the presence of a catalyst such as acetic acid, it is generally accepted that lead oxide reacts with acetic acid to produce soluble lead acetate which in turn reacts with arsenic acid to form lead arsenate precipitate and to liberate acetic acid which in turn reacts with more lead oxide. Hence, it will be understood the absence of lead in soluble form in the liquid medium in which the reaction is taking place indicates either of two conditions—(1) the presence of arsenic acid in quantity to just react theoretically with soluble lead, or (2) the presence of arsenic acid in amount greater than that theoretically required to react with the soluble lead. In the present process, operations are conducted so that in the first phase there is maintained preferably an excess of lead oxide or permissibly the absence of an excess of arsenic acid over that quantity theoretically combining with the lead to produce lead arsenate. Thus in the preferred procedure there would be present in the liquid medium an appreciable amount of soluble lead, whereas in the permissible procedure while there would be theoretically no excess of arsenic acid there would also theoretically be substantially no soluble lead present. Accordingly, in the preferred procedure feed of raw materials into the reaction mass is controlled so as to maintain in the liquid medium some appreciable quantity of soluble lead, such condition indicating the presence of an excess of lead and of course the absence of an excess of arsenic acid.

The lower limit of the PbO excess is to some extent a matter of convenience to the operator and may be chosen so as to facilitate maintenance of such excess without difficulty. To insure the absence of an excess of arsenic acid during the first stage, introduction of lead oxide and arsenic acid should be conducted so as to maintain in the liquid medium soluble lead to the extent of not less than say 0.1% by weight of the liquid. However, the better results with respect to operating convenience and as to the nature of the final product may be obtained where there is maintained in the liquid medium a soluble lead content of about 0.5% as in the above specific example. In most instances it is mechanically impracticable to operate so as to maintain the soluble lead content of the liquid during the first phase much less than about 0.5%.

Regarding the upper limit of the PbO excess during the first phase, introduction of lead oxide and arsenic acid should be conducted so that the soluble lead content of the liquid medium is not more than about 2.1% by weight of the liquid. If the soluble PbO excess is to be maintained much higher excessive amounts of catalyst are required. Further, undesirable normal lead arsenate may form, and difficulty may be encountered in relatively quickly swinging the reaction over to an excess of arsenic acid at the end of the first and at the beginning of the second phase. In the first phase a PbO excess such as to create in the liquid medium a soluble lead content of about 0.5% by weight of the liquid is a practicable working excess since it is mechanically simple to maintain such an excess which in turn is not sufficiently large to prevent relatively quick change-over to an excess of arsenic acid at the beginning of the second phase. While a product having the most desirable characteristics may be made by maintaining an excess of lead oxide during the first phase, a good product may also be obtained by carrying out the first phase of the reaction in the absence of an excess of arsenic acid, i. e., by using reacting proportions of lead oxide and arsenic acid throughout the first phase. In such instance it will be understood there will be substantially no soluble lead in the liquid medium at any time. In most cases, however, such procedure is of no great value on account of mechanical difficulties involved in working so as to just avoid an excess of acid. An excess of acid is undesirable because the reaction is slowed up and the formation of the proper type of seed crystal is hindered.

During the first phase of the reaction the litharge and arsenic acid are added at controlled rates preferably so that the litharge is assimilated by the catalyst as fast as it is added and the arsenic acid is added at such rate as to directly combine with the soluble lead at the rate at which it is delivered by the catalyst. Any of the well-known catalysts such as acetic or nitric acids may be used.

When proceeding in accordance with the process of the invention as illustrated in the above example, as soon as arsenic acid is introduced formation of acid lead arsenate commences. Since in the first phase lead oxide is preferably in excess, the lead arsenate formed during such phase is understood to be the same with respect to crystal structure and chemical composition as are the lead arsenates produced in the usual methods in which the entire reaction is carried out in the presence of an excess of litharge. If the reaction taking place in the first phase were permitted to continue (that is in the presence of an excess of litharge) to the end of the completed lead oxide-arsenic acid reaction, the ultimate product obtained would be the same as the lead arsenate formed in the usual present commercial methods. In the time interval during which the first phase of the reaction proceeds, a given quantity of what may be termed usual type of lead arsenate crystals is formed. It is believed the lead arsenate crystals produced during the first phase act as seed crystals for the particular type of lead arsenate formed in the second phase. As shown above, from the beginning of the second phase an excess of arsenic acid is maintained during the remainder of the reaction, and during the second phase the particular type crystal constituting the product of the present invention is formed. It is thought that as soon as an arsenic acid excess condition prevails, lead arsenate particles produced during the second phase begin to build up upon the seed crystals formed in the first phase. By the process of the invention, such building up apparently occurs on definite crystal faces only and continues during the second phase with the result that at the end of the reaction, the product obtained is the pearly lustered, flake-like crystal previously described. When carrying out the total lead oxide-arsenic acid reaction in the manner described in the example, the ultimate product, while having the described physical characteristics, is yet very finely divided and does not require grinding to form a readily water suspensible product. Since it appears reasonably probable that the characteristic crystal structure of the product is the basis for improved coverage, as previously explained, it will be seen that absence of necessity for grinding is of substantial importance because there is no breaking down of crystal structure which would result were grinding required.

In the example, during the first phase about 10% of the total amount of PbO used was reacted with arsenic acid. The amount of PbO reacted in the first phase is permissibly subject to some variation. Since during the first phase, the lead arsenate formed is apparently substantially the same, with respect to physical characteristics, as the lead arsenate produced in usual commercial methods (where the entire reaction is carried out in the presence of an excess of litharge), it will be understood that as the quantity of PbO reacted in the first phase is increased, the amount of PbO reacted in the second phase, during which the characteristic crystals of the invention are formed, is correspondingly decreased with the result that the characteristics of the final product will correspondingly more nearly approach the characteristics of the usual type of lead arsenate product. On the other hand, if the amount of PbO reacted in the first phase is too little, too few usual type lead arsenate seed crystals will be formed and the result is that during the second phase while the new type crystals is formed, such crystals are too large and to this extent are objectionable as grinding would usually be required with resultant breaking down of the desirable flaky crystal structure. Accordingly, for any given set of working conditions, the amount of PbO reacted during the first phase should be determined by a few test runs. Investigations on which the invention is based show that optimum results with respect to physical and chemical characteristics of the final crystal are obtained where the procedure is such that in the first phase an excess of lead oxide is maintained, and in the second phase an excess of arsenic acid is maintained, and that during the first phase a minor portion, and not more than 40%, of the total lead oxide is reacted with arsenic acid.

With respect to the arsenic acid excess in the second phase, the more desirable results may be obtained where an excess of soluble arsenic acid of the order of about 0.6% by weight of the liquid is maintained throughout as in the above specific example. The extent of the arsenic acid excess appears to be variable to some extent according to the amount of lead arsenate present in the reaction mass. At the beginning of the second phase, the arsenic acid excess may be less than at the end of the second phase when lead arsenate is present in maximum quantity. At the beginning of the second phase, the arsenic acid excess should not exceed about 1.8% by weight of the liquid. During the second phase, the soluble arsenic acid excess may range from about 0.1% to about 1.8% by weight of the liquid. No particular advantage arises from use of a high arsenic acid excess, since there appears to be no especial improvement in crystal form, and more PbO is necessary to balance the mass at the end of the second phase. Considering the second phase as a whole, if the arsenic acid excess is too low, i. e. less than about 0.1%, the new type crystal does not form to such a pronounced degree with the result that the final product most closely resembles the usual lead-arsenate produced by methods in which an excess of lead oxide is maintained substantially throughout the entire reaction. On the other hand, if in the process of the invention too great an excess of acid is used, i. e., in excess of 1.8% by weight, the rate of reaction is slowed down substantially and may stop if the excess is sufficiently large.

Feed of litharge and arsenic acid is continued until all of the acid to be employed is charged into the reaction zone. At this stage when proceeding in accordance with the example, the reaction mass still contains an excess of arsenic acid in the liquid medium. As a precaution against the presence of water soluble arsenic in the final product, the mass in the reaction vessel is balanced with respect to litharge and arsenic acid. For this purpose, whatever litharge is needed to balance the batch is then introduced, and the resulting slurry may be dried on a drum drier. If desired, the lead arsenate precipitate may be filtered out of the reaction liquor without the so-called balancing. In this situation, water soluble arsenic acid remains in the filtrate. Such alternative procedure may not be particularly desirable in some circumstances because of the possibility of leaving some water soluble arsenic in the final product.

During the entire reaction the temperature of the mass becomes gradually raised by reason of the heat evolved. It is preferred to terminate the reaction at about the boiling temperature and for this purpose extraneous steam may be introduced directly into the mass. The advantage of finishing the reaction at boiling temperature is that the resulting slurry dries very easily on a drier of the drum type.

Another satisfactory way of insuring maintenance of the desirable excess of lead oxide in the first phase and an excess of arsenic acid in the second phase is by regulating introduction of the lead oxide and arsenic acid so as to create certain pH conditions during the first and second phases. At the start of the process, as illustrated in the above example, acetic acid is mixed with an amount of water such as to maintain the mass throughout the reaction in a readily agitatable and flowable condition. Addition of acetic acid to the water produces a solution having a certain pH which in the example is about 3. It will be understood that the acid catalyst used induces a certain pH which, in the absence of either an excess of PbO or arsenic acid during the reaction, (i. e., presence of theoretically reacting proportions of PbO and arsenic acid) remains constant throughout the reaction. Such specific pH induced is dependent upon the nature of the catalyst and to some extent upon dilution of the mass. For example, if nitric acid were employed in place of acetic acid as in the example the pH induced by nitric acid would be somewhat lower, (e. g., about 2) than the 3 pH in the example.

When controlling operations by means of pH values it will be understood that, regardless of the particular catalyst used and the dilution of the reaction mass at any point during the process, in the first phase introduction of lead oxide and arsenic acid is controlled so as to maintain the pH above the pH value induced by the catalyst, and in the second phase introduction of lead oxide and arsenic acid is controlled so as to maintain the pH value below the pH induced or tended to be induced by the catalyst.

In the above specific example, feed of lead oxide and arsenic acid is controlled so that during the first phase there is maintained a pH of about 5. Such pH value is subjected to variation, and while it is preferred to conduct the first phase so as to maintain a pH of about 5, the pH during the first phase may be as low as about 4 and as high as about 8. In the example, during the second phase introduction of lead oxide and arsenic acid is controlled so as to maintain a pH of about 1.9, such pH being also subject to some variation, the better results being obtained where such pH is not greater than about 2.5 and not less than about 1.5. Regardless of the particular catalyst employed, when controlling the excess of lead oxide in the first phase and the excess of arsenic acid in the second phase by regulating pH conditions, in the first phase introduction of lead oxide and arsenic acid are controlled so as to maintain pH values not in excess of about 8 and in excess of the pH induced by the catalyst, and in the second phase, feed of raw materials is regulated so as to maintain pH values less than that induced by the catalyst and not less than about 1.5.

With respect to selection of the lower and upper pH limits of both the first and second phases, the same considerations are controlling as discussed previously in connection with regulation of the excess of lead oxide in the first phase in terms of quantities of soluble lead present, and regulation of excess arsenic acid in the second phase, in terms of quantities of soluble arsenic acid present in the liquid medium.

In addition to possessing the physical characteristics previously described, the product of the process is very finely divided and does not require grinding. Tests show that in the neighborhood of 98.5 to 99% of the product in unground condition passes a 300 mesh screen.

In the appended claims the expression "lead oxygen compound" is intended to include lead oxide and lead hydroxide.

I claim:

1. The method for making lead arsenate from given quantities of lead oxygen compound and arsenic acid in a two-phase reaction which comprises continuously feeding lead oxygen compound and arsenic acid into a reaction zone, causing such substances to react during an initial reaction phase to form lead arsenate, regulating feeding of lead compound and arsenic acid so as to introduce into the reaction mass minor portions of reactant ingredients and to maintain an excess of lead compound during said initial phase, then continuing feeding into the resulting reaction mass the remaining major portions of said compound and said arsenic acid, causing such remaining portions to produce further quantities of lead arsenate, regulating introduction of such remaining portions so as to maintain an excess of arsenic acid, and recovering lead arsenate.

2. The method for making lead arsenate from lead oxygen compound and arsenic acid in a reaction including two phases which method comprises feeding lead oxygen compound and arsenic acid into a reaction zone, causing such substances to react during an initial reaction phase to form lead arsenate, regulating feeding of lead compound and arsenic acid so as to introduce into the reaction zone minor portions of the total reactant ingredients used and to maintain an excess of lead compound during said initial phase, then feeding into the resulting reaction mass major portions of the total lead oxygen compound and arsenic acid used, causing such major portions to react to produce further quantities of lead arsenate, regulating feeding of such major portions so as to maintain an excess of arsenic acid, and recovering lead arsenate.

3. The method for making lead arsenate from lead oxygen compound and arsenic acid in a reaction including two phases and carried out in the presence of a catalyst which method comprises feeding lead oxygen compound and arsenic acid into a reaction zone containing a catalyst, causing lead oxygen compound and arsenic acid to react during an initial reaction phase to form lead arsenate, regulating feeding of lead compound and arsenic acid so as to introduce into the reaction zone minor portions of the total lead oxygen compound and arsenic acid used and to maintain during said initial phase a pH higher than that induced by the catalyst, then feeding into the resulting reaction mass major portions of the total lead oxygen compound and arsenic acid used, causing such major portions to react to produce further quantities of lead arsenate, regulating feeding of such major portions so as to maintain a pH lower than that induced by the catalyst, and recovering lead arsenate.

4. The method for making lead arsenate from lead oxygen compound and arsenic acid in a reaction including two phases and carried out in the presence of a catalyst which method comprises feeding lead oxygen compound and arsenic acid into a reaction zone containing catalyst, causing lead oxygen compound and arsenic acid to react during an initial reaction phase to form lead arsenate, regulating feeding of lead compound and arsenic acid so as to introduce into the reaction zone minor portions of the total lead oxygen compound and arsenic acid used and to maintain during said initial phase a pH not higher than about 8 and higher than that induced by the catalyst, then feeding into the resulting reaction mass major portions of the total lead oxygen compound and arsenic acid used, causing such major portions to react to produce further quantities of lead arsenate, regulating feeding of such major portions so as to maintain a pH lower than that induced by the catalyst and not less than about 1.5, and recovering lead arsenate.

JAMES W. SWAINE.